(12) United States Patent
Bauman et al.

(10) Patent No.: US 6,874,234 B1
(45) Date of Patent: Apr. 5, 2005

(54) PROCESS FOR FORMING STEEL ROLLER BEARINGS

(75) Inventors: William Dean Bauman, Dorr, MI (US); David W. Koetsier, Grand Rapids, MI (US); Robert H. Erhardt, Shelby, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/576,731

(22) Filed: May 23, 2000

(51) Int. Cl.⁷ .............................................. B21D 53/10
(52) U.S. Cl. ............................ 29/898.066; 29/898.06; 29/557; 82/1.11
(58) Field of Search ......................... 29/898, 898.054, 29/898.06, 898.066, 898.068, 898.056; 384/567; 82/1.11

(56) References Cited

U.S. PATENT DOCUMENTS

| | | | |
|---|---|---|---|
| 1,971,083 A | * | 8/1934 | Schlaa |
| 4,077,812 A | * | 3/1978 | Tani |
| 4,202,082 A | | 5/1980 | Williams ............... 29/149.5 B |
| 4,450,703 A | | 5/1984 | McCloskey ................. 72/342 |
| 4,593,444 A | * | 6/1986 | Kavthekar |
| 4,802,775 A | * | 2/1989 | Takata ........................ 384/450 |
| 4,820,240 A | * | 4/1989 | Girguis |
| 5,453,139 A | | 9/1995 | Gallagher, Jr. .............. 148/651 |
| 5,878,496 A | | 3/1999 | Liu et al. ............... 29/898.066 |
| 6,019,517 A | * | 2/2000 | Katsuki et al. ........ 29/898.066 |
| 6,171,411 B1 | * | 1/2001 | Okita et al. |
| 6,440,237 B1 | * | 8/2002 | Skilling et al. |

FOREIGN PATENT DOCUMENTS

| | | | |
|---|---|---|---|
| DE | 3804654 A1 | 8/1989 | ........... F16C/33/64 |
| EP | 1157776 A2 | 11/2001 | ........... B23P/15/00 |
| JP | 06-246546 | * 9/1994 | .................. 29/898 |

OTHER PUBLICATIONS

Mechanical Engineer' Handbook (ed. Myer Kutz). John Wiley & Sons, Inc. 1986, pp. 892–2895.*

"Super Abrasives and Honing" Accu–Cut Web–site [http://www.accucutdiamond.com/superabrasives.htm] acc'd. Feb. 3, 2003.*

* cited by examiner

*Primary Examiner*—Eric Compton
(74) *Attorney, Agent, or Firm*—Patrick M. Griffin

(57) ABSTRACT

A process for forming a metal, preferably steel, roller bearing comprising the steps of providing a hardened steel cylindrical blank having end face surfaces, a lateral surface defining an outer diameter, and a centered circular bore whose surface defines an inner diameter; hard turning the surface of the bore to a specified inner diameter; and hard turning the lateral surface of the blank to achieve, in a single set up, a final form of the bearing having a specified outer diameter with a radial crown.

13 Claims, 1 Drawing Sheet

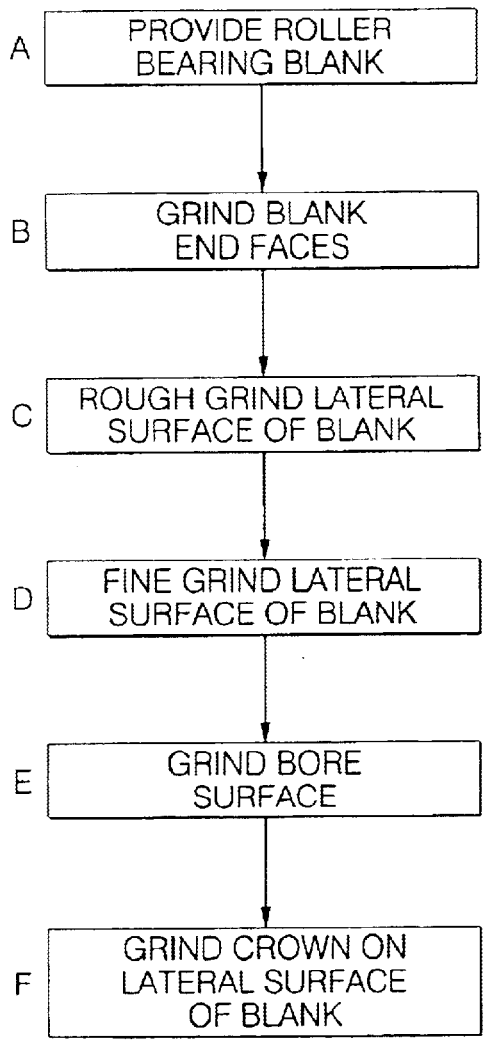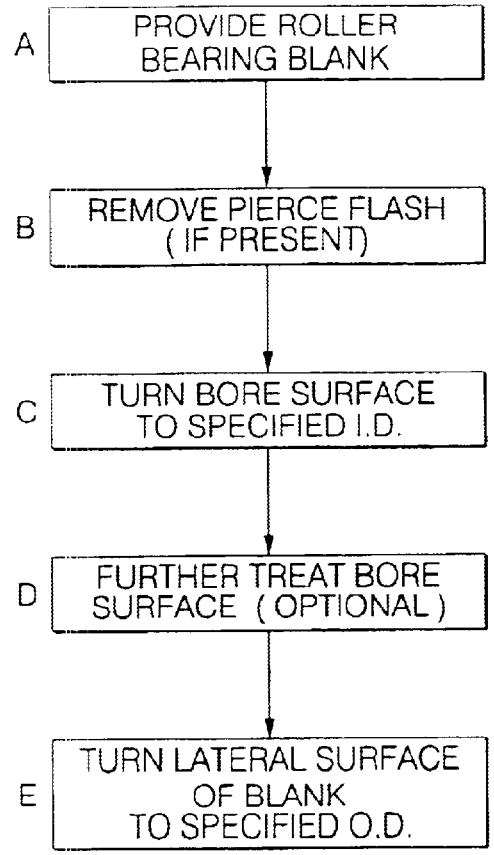
FIG. 2
PRIOR ART
FIG. 1

PROCESS FOR FORMING STEEL ROLLER BEARINGS

CROSS-REFERENCE TO RELATED APPLICATION

This application is related to commonly assigned application Ser. No. 09/577,174, now U.S. Pat. No. 6,440,237, filed May 23, 2000 for COLD FORMED HIGH-LOAD BEARING STEEL PARTS AND PROCESS FOR FORMING SAME, the disclosure of which is incorporated herein by reference.

TECHNICAL FIELD

The present invention relates to the formation of steel parts and, more particularly, to a process for forming steel roller bearings. Most particularly, the present invention relates to the process of final finishing roller bearings with a minimal amount of machining steps.

BACKGROUND OF THE INVENTION

High-load bearing steel parts made of high strength steels are widely used in the automotive industry for a variety of applications such as, for example, roller bearings included in hydraulic valve lifters and roller finger followers for automotive engines. Critical features of these roller bearings such as their inside and outside diameters and end face surfaces must be manufactured and finished to close engineering tolerances to optimize performance, to minimize wear, and to extend the life of the part, which is subjected to extreme engine operating conditions. The need for high strength steels manufactured and finished to exacting tolerances has become even greater with the application of smaller, more efficient engines in today's vehicles.

Roller bearings are typically fabricated from high carbon steel by hot or warm forging processes, or by machining bar stock. Hot forging requires first heating a steel slug in its preformed state to a temperature of about 1600–2000° F. to allow formability. Mechanically forming techniques well known in the art, for example, upsetting, heading, and extrusion are then used to bring the shape of the part close to the final desired form. However, because of surface scaling resulting from the high temperature preheating process and because of the dimensional growth of the part as it cools, a substantial amount of final machining is required to achieve its required dimensions. For example, the parallel end face surfaces of the part must be machined to their final dimensions and surface finish. Then, using the finished end face surfaces as reference, the inside and outside diameters are machined to their rough and final dimensions and surface finished, typically, by centerless grinding. Because of the amount of material to be removed, machining often must be completed in several steps, including rough cutting to bring the part to its general desired shape, grinding to bring the part close to its specified dimensions, and honing to bring the part within its final dimensional tolerances and to obtain a desired surface finish. In the case of the inner diameter surface of the roller bearing, a further step can be added to achieve a desired surface pattern, such as cross-hatching, to optimize the distribution of lubricating oil on its surface. These added time-consuming machining operations require a great deal of part handling and tool set up and the use of expensive machine tools and skilled labor to operate the tools. Furthermore, the added machining operations can produce substantial part-to-part variation that negatively affects part performance and wear.

Warm forging requires the steel slug to be first heated to a lower temperature than hot forming processes, typically about 300–1600° F., before the part is mechanically formed by use of one of the forming methods described above. While surface scaling typically does not occur because of the relatively lower temperatures used in the warm forming process, dimensional growth of the part does occur as the part cools. As a result, a substantial amount of machining and finishing of the end face surfaces and the inner and outer diameters is sill required.

Machining the part to the required dimensions from bar stock eliminates the expense and potential dangers of having to preheat the slug before forming. However cycle times are typically substantially longer than either the hot or warm forming processes since more material has to be removed to reach the final desired dimensions. Moreover, a greater amount of material must be inventoried to manufacture the part, and a substantial amount of material is wasted in the form of metal shavings. Expensive machine tools are required and the results from the machining operations can vary widely from part to part. Also, since substantially more machining and final finishing of the part is required, a significant amount of cost is added to the product due to the higher cost of skilled labor and the additional energy consumption associated with the machining and finishing.

Cold forming processes are carried out at temperatures ranging from ambient up to about 300° F. and include techniques such as upsetting, heading, and extrusion. Cold forming processes offer many advantages over the above mentioned processes in that the formed part is close to "net shape", that is, many of the part dimensions resulting from the cold forming process require no further machining to achieve a final desired dimension. The cold forming process disclosed and claimed in the cross-referenced related application, whose disclosure is incorporated herein by reference, had advantages over previously know cold forming processes in that it uses a slug made from high-carbon, high strength steel that provides excellent wear performance.

FIG. 1 is a flow chart showing the steps of a prior art process for fabricating a roller bearing. In step 1-A, a blank that can be fabricated by any of the above described forming, forging, or machining techniques is provided. In step 1-B, the end faces are ground to a specified finish, typically by holding the blanks and passing it between the disks of a double-disk grinder such as, for example, a Besley grinder. Since, in the prior art the finished end face surfaces provide the reference for subsequent grinding steps to obtain the specified outside and inside diameters of the bearing, it is extremely important that the end faces be carefully ground perpendicular to the axis of the bearing and parallel to each other. Thus, because of the accuracy needed, it is necessary to inspect and reface the surfaces of the grinding disks frequently.

In step 1-C, the cylindrical lateral surfaces of the blanks with finished end face surfaces are rough ground to provide an approximate outside diameter for the bearing. This operation is typically carried out simultaneously on multiple pieces using a centerless grind machine such as, for example, a Cincinnati Milacron Model 230-10 machine, available from the Milacron Co., Cincinnati, Ohio. Since the multiple pieces must be aligned, end face to end face, along their axes as the pieces pass through the centerless grinder, the accuracy of the finished outer diameter is dependent on the accuracy in which step 1-B was completed. In an ensuing separate step 1-D, the outer diameter of the bearing is fine ground to its specified finished surface, again using the Cincinnati Milacron centerless grind machine and again relying on the accuracy of step 1-B.

In step 1-E, the bore, or inside diameter of the bearing is ground using, for example, a Heald internal grinding machine. To complete this step, the bearing must first be mounted in the grinding machine by holding or "chucking" on to the bearing's finished outer diameter surface. This step is a time-consuming operation that requires tight control and is carried out one part at a time. Although the time required for grinding each part after machine preparation is typically only about 20 seconds, preliminary grinding of the chuck, which is needed to achieve close tolerances, requires up to four hours. In the final step 1-F, the bearing crown is ground, with high precision requirements, using a centerless grinder such as the Cincinnati Milacron machine. Once again, since the pieces are aligned end face to end face to complete this step, the accuracy achieved from this step is dependent on the accuracy in which step 1-B was completed.

Between each of these steps, an inspection of the bearing is typically performed to assure that the preceding step was properly completed.

Until this invention, it was thought necessary to complete the machining and finishing process on a roller bearing using multiple steps, including precision grinding of the parallel end face surfaces, and machining, finishing, and crowning the outside diameter of the roller bearing in separate steps on a centerless grinding machine. Needed in the art is a method of manufacturing a high load bearing part using a minimal number of finishing and/or machining operations. Also needed is a high load bearing part that minimizes scrap and consequent waste of raw materials. Further needed in the art is a method for making a high load bearing part that can be made to close dimensional tolerances with minimal part-to-part variation. The process of the present invention meets these needs.

It was thought that, in order to assure tight dimensional tolerancing and precise finishing of the bearing's inside diameter and outside diameter, the steps of machining and finishing the end surfaces of the bearing had to be completed first, after which the machining, finishing and crowning of the outside diameter had to be completed on a centerless grind machine. Until now, there has been lacking a method of machining steel roller bearings with a minimal number of steps.

SUMMARY OF THE INVENTION

The present invention is directed to a process for forming a metal, preferably steel, roller bearing that reduces the amount of time consumed to complete the process and the number of machining and finishing steps necessary compared to previously known processes.

In one embodiment, the invention comprises the steps of providing a hardened steel cylindrical blank having end face surfaces, a lateral surface defining an outer diameter, and a centered circular bore whose surface defines an inner diameter. The surface of the bore is hard turned to a specified inner diameter and the lateral surface of the blank is hard turned to achieve, in a single setup, a final form of the bearing having a specified outer diameter with a radial crown. The process of the present invention eliminates the need for machining the end face surfaces of the bearing.

The present invention also eliminates a number of set-up, machining, finishing and inspection steps, which thereby reduces scrap and waste of raw materials as well as lower total lost to produce a bearing.

The above and other advantages of the present invention will be understood from the following description with reference to the drawings.

BRIEF DESCRIPTION OF THE DRAWINGS

FIG. 1 is a flow chart depicting the steps a typical prior art process for forming a steel roller bearing.

FIG. 2 is a flow chart depicting the steps for forming a steel roller bearing by the process of the present invention.

DESCRIPTION OF THE PREFERRED EMBODIMENT

Roller bearing blanks useful in the process of the present invention can be obtained by machining, cold forming, warm forging, or hot forging, cold forming being preferred. Warm and hot forged products typically have less readily controlled net form dimensions than those obtained by cold forming and may thus require further processing to meet specifications. Cold forming fabrication of steel parts typically utilizes' low- to medium-carbon steels, i.e., steels having a carbon content of 0.6 weight percent or less. The cold forming process disclosed and claimed in the cross-referenced related application, however, uses a slug made from high-carbon, high strength steel. As described in that application, cold forming includes upsetting, where the cross-sectional area of a portion or all of a slug is increased, and extruding, where the slug is forced through the orifice of a die to produce a blank of decreased uniform cross-section. Upsetting at substantially ambient temperature can be carried out using commercially available machinery such as a nut former or a header machine.

Following cold forming and prior to finishing in accordance with the process of the present invention, the blank is heat treated as known in the art, i.e., austenitized, quenched, and tempered to produce sufficient hardness for the desired application. Useful austenitizing temperature and time ranges are about 1475° F. to about 1625° F.

FIG. 2 is a flow diagram illustrating the steps for forming a roller bearing by the process of the present invention. In step 2-A, is provided a steel blank, which can be fabricated by any of the above described forming, forging, or machining techniques, followed by heat treatment. If the blank has been made using a cold forming method, a pierce flash can be removed by hard turning in an optional step 2-B that does not require close control.

In step 2-C, the surface of the bore is hard turned to a specified inner diameter, using, for example, a diamond honing machine such as an Accu-Cut machine, available from Accu-Cut Co., Norridge, Ill. This step, which requires about 25 seconds, is typically carried out simultaneously with multiple parts, four being a convenient number, using a series of spindles. A first spindle may be used to obtain the rough inside diameter, and a second spindle may be employed for superfinishing the bore surface to specification. In an optional step 2-D, a third spindle may be used to incise the bore with a cross-hatch pattern that facilitates distribution of oil on the bore surface. Crosshatching of the bore surface may be carried out between the first turning and superfinishing stages.

In step 2-E, the lateral surface of the blank is hard turned, one part at a time, to achieve, in a single turning operation, the final form of the bearing having a specified final outer diameter with a radial crown. This step is preferably carried out using a computer numerically controlled (CNC) Hardinge lathe provided with a cubic boron nitride or ceramic cutting tool, available from Hardinge Co., Elmira, N.Y.

The steps of hard turning of the surface of the bore and the lateral surface of the blank can be carried out in either order, i.e., step 2-E may be carried out before steps 2C and 2-D.

A comparison of the flow charts of FIGS. 1 and 2, which depict processes of the prior art and the present invention, respectively, for forming a roller bearing shows that, whereas the prior art process entails grinding of the end faces (step 1-B) followed by three separate grinding operations on the lateral surface of the blank to obtain the specified outer diameter of the bearing (steps 1-C, 1-D, and 1-F), the process of the present invention achieves the final form of the bearing, having a specified outer diameter with a radial crown, in a single hard turning of the blank's lateral surface. Further, the present invention does not require machine grinding of the end faces of the bearing. Thus, compared with manufacturing processes of the prior art, the process of the present invention requires fewer steps and is less capital-intensive, utilizing commercially available as opposed to custom-designed machinery. Furthermore, the roller bearing forming process of the present invention requires less skilled labor than previously known methods, substantially reduces part-to-part variability, and yields substantial time savings, the manufacturing time being cut approximately by half.

The invention has been described in detail for the purpose of illustration and understanding. It is understood that such detail is solely for illustration purposes, and variations can be made without departing from the spirit and scope of the invention, which is defined solely by the following claims.

What is claimed is:

1. A process for forming a metal cylindrical bearing roller, said process consisting of the steps of:

obtaining a hardened metal cylindrical blank having end face surfaces, a lateral surface defining an outer diameter, and a centered circular bore, said bore having an inner surface defining an inner diameter;

honing the inner surface of the bore having a specified inner diameter, thereby forming an inner bearing surface;

hard turning the lateral surface of the blank to a specified outer diameter, thereby forming an outer bearing surface concentric with said inner bearing surface, wherein said hard turning the lateral surface of the blank further includes forming a radial crown, wherein said end face surfaces are unmachined; and thereby forming a metal cylindrical bearing roller.

2. The process of claim 1 wherein said blank is made of a steel material and is formed by a method selected form the group consisting of warm forging, hot forging, cold forming, and machining.

3. The process of claim 2 wherein said formed blank is heat treated.

4. The process of claim 1 wherein said blank is cold formed and comprises a pierced flash, said process further comprising:

prior to honing said inner surface of said bore to a specified inner diameter, removing said pierced flash.

5. The process of claim 4 wherein said removing said pierced flash is carried out by honing said inner surface of said bore.

6. The process of claim 1 wherein said honing of said inner surface of said bore is carried out using a diamond honing machine.

7. The process of claim 1 further comprising:

forming an incised cross-hatch pattern on said inner surface of said bore.

8. The process of claim 1 wherein said hard turning said lateral surface is carried out using a computer numerically controlled (CNC) lathe.

9. The process of claim 1 wherein said honing the inner surface of said bore precedes said hard turning the lateral surface of said blank.

10. The process of claim 1 wherein said hard turning the lateral surface of said blank precedes said hard turning the inner surface of said bore.

11. The process of claim 8 wherein said lathe comprises a cubic boron nitride or ceramic cutting tool.

12. The process of claim 1 wherein said hard turning the lateral surface of the blank is carried out in a single operation.

13. The process of claim 1 wherein said end face surfaces of said cylindrical blank comprise end face surfaces of said cylindrical bearing roller.

* * * * *